Patented Oct. 30, 1923.

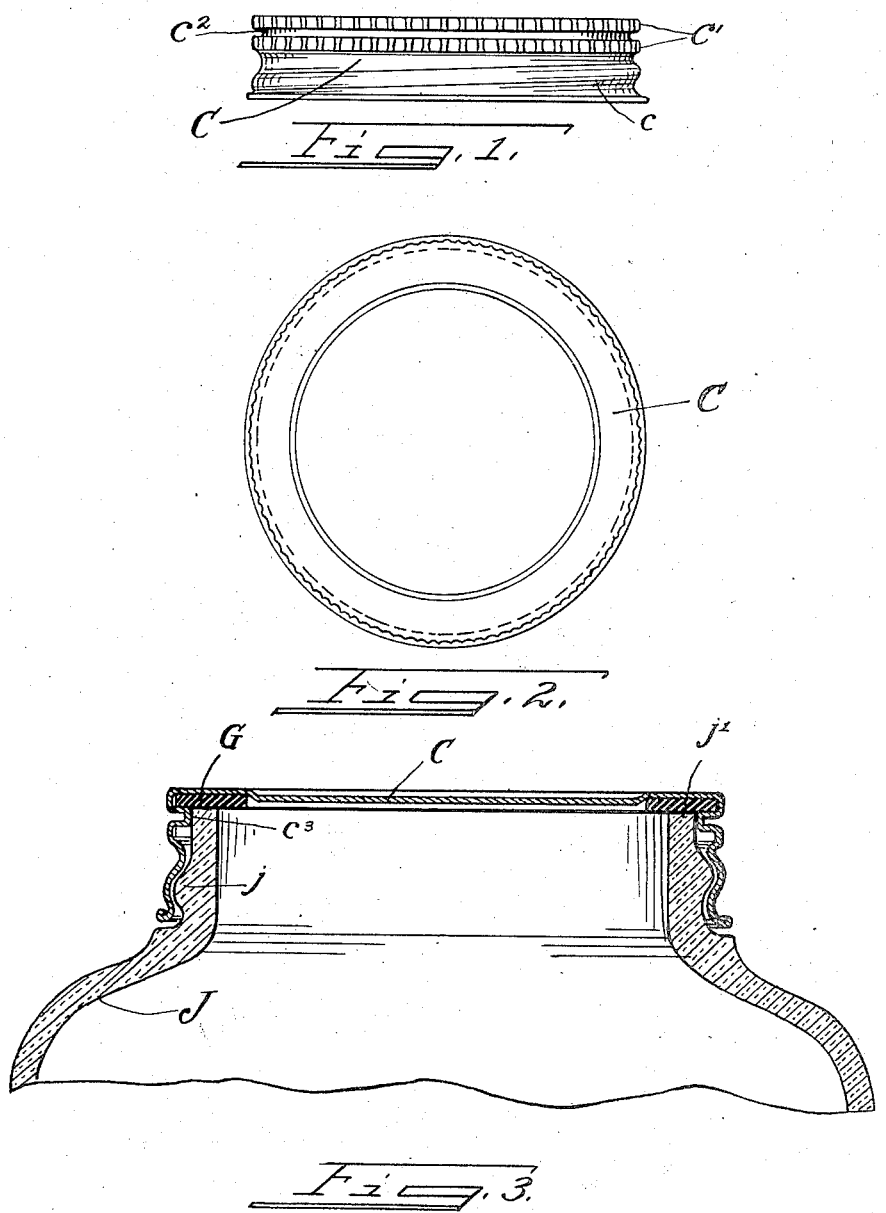

1,472,398

UNITED STATES PATENT OFFICE.

CECIL H. LONGMAN, OF CINCINNATI, OHIO, ASSIGNOR TO THE SECURITY METAL PRODUCTS COMPANY, OF CINCINNATI, OHIO, A CORPORATION OF OHIO.

SEALING TOP FOR FRUIT JARS.

Application filed October 24, 1921. Serial No. 510,109.

*To all whom it may concern:*

Be it known that I, CECIL H. LONGMAN, a citizen of the United States, residing at Cincinnati, in the county of Hamilton and State of Ohio, have invented new and useful Improvements in Sealing Tops for Fruit Jars, of which the following is a specification.

My invention relates to screw tops for fruit jars. These tops are, in large canning plants, screwed into sealing position by machinery, and must be handled with great rapidity as under normal factory conditions a sealing machine will secure about sixty of them a minute to the cans.

From this it will be seen that there must be means for holding the sealing gasket securely in place so that the gasket will not be accidentally displaced under factory conditions.

Various expedients have been resorted to, to provide this security, as, for instance, securing the gasket to the top by some adhesive substance; and making a two-piece device with a threaded rim and a disc cap with the outer edge of the cap crimped down upon the gasket so as to make it impossible to remove it except by tearing it out and destroying it.

My improvement provides a one-piece top suitable for use on mechanical sealing machines with a recess of substantially the same depth as the sealing gasket within which the outside of the sealing gasket seats, and an inwardly extending annular shelf upon which the gasket rests.

This holds the gasket securely in position while the top is being handled preparatory to and in placing it upon the jar and at the same time allows the ready removal of the gasket when the top is removed from the jar. This is important because these jars are re-used by housewives and all that will be necessary with my device will be the purchase of a new sealing gasket, placing it in position without the use of adhesives or tools, and then screwing the top into position by hand or otherwise at the convenience of the housewife.

My invention is illustrated in the accompanying drawings in which:—

Figure 1 is an elevation of one of the caps;

Fig. 2 is a top plan view of same, with the inside edge of the annular shelf shown by the dotted line, and Fig. 3 is an axial section of a fruit jar with the cap in sealing position thereon.

Referring now to the drawings; C is a cap with thread $c$ adapted to co-act with the threads $j$ of the jar J. At the top this cap is provided with corrugations $c^1$ adapted to be gripped by the jaws of the sealing machine. Without interfering with these corrugations either above or below it, a peripheral slot $c^2$ is formed providing on the inside of the top an annular shelf $c^3$ with space equal to the thickness of the sealing gasket G between the shelf and the under-surface of the flat portion of the top.

The gasket G, usually made of a rubber composition, is provided just large enough to seat easily and snugly in the top in the space so provided and will not be dislodged unless purposely taken out. The gasket G seats firmly upon the top edge $j^1$ of the jar J when the cap is screwed into seating position.

Obviously the corrugations $c^1$ may be only above or only below the peripheral slot $c^2$ but I have shown corrugations on both sides of the slot in the drawing as the preferred form.

I claim as my invention and desire to secure by Letters Patent of the United States:—

1. A one-piece screw top for jars consisting of a circular disc, a depending flange integral with the outside edge of said disc, a circumferential slot formed at the top of said flange by an annular shelf on said flange, the space between said shelf and the under side of the top being substantially the thickness of the gasket and substantially the diameter of the outside of the gasket.

2. In a threaded one-piece top for jars, the combination of corrugations on the upper part of the periphery of said top, and an inwardly extending slot on the flange of said top forming an annular recess at the top of said flange of substantially the same thickness and diameter as the sealing gasket.

3. In a one piece metal screw top for jars consisting of a circular disc, a depending flange integral with the outside edge of said disc, a circumferential slot formed at the top of said flange by an annular shelf on said flange, and a gasket the outside periphery of which lies within said slot in such a manner as to hold said gasket in place, leaving the inner flat side of said gasket free to contact with the top edge of the walls of the jar.

In testimony whereof I have hereunto set my hand in presence of two subscribing witnesses.

CECIL H. LONGMAN.

Witnesses:
CARL PHARES,
NORMA D. BERGER.